W. B. LUCAS.
RECTIFIER.
APPLICATION FILED JULY 31, 1916.

1,301,581.

Patented Apr. 22, 1919.
7 SHEETS—SHEET 3.

Witnesses:
George C. Schultz
Fred M. Davis

Inventor
William B. Lucas
By Rummler & Rummler Att'ys.

W. B. LUCAS.
RECTIFIER.
APPLICATION FILED JULY 31, 1916.

1,301,581.

Patented Apr. 22, 1919.
7 SHEETS—SHEET 6.

UNITED STATES PATENT OFFICE.

WILLIAM B. LUCAS, OF OAK PARK, ILLINOIS, ASSIGNOR OF ONE-HALF TO EUGENE L. MARKEY, OF EVANSTON, ILLINOIS.

RECTIFIER.

1,301,581.  Specification of Letters Patent.  Patented Apr. 22, 1919.

Application filed July 31, 1916. Serial No. 112,315.

*To all whom it may concern:*

Be it known that I, WILLIAM B. LUCAS, a citizen of the United States of America, and a resident of Oak Park, county of Cook, and State of Illinois, have invented certain new and useful Improvements in Rectifiers, of which the following is a specification.

This invention relates to means for changing alternating currents, single and polyphase, to direct or substantially constant unidirectional current, and more particularly to means generally known as rectifiers as distinguished from those dynamo-electric machines having an armature equipped with both collector rings and a commutator and commonly known as "rotary converters."

The main objects of the invention are to provide an improved form of rectifier adapted to furnish a current the potential of which is always in the same direction and substantially constant, or constant, except for relatively brief intervals when the primary voltage passes through that part of its cycle which is approximately zero; to provide in connection with a rectifying commutator, an inductive voltage regulating means adapted for automatic control for boosting the voltage according to the instantaneous phase of the primary voltage curve; to provide in connection with a synchronously operated rectifying commutator a self-inductive or transformer member also synchronously operated and arranged to step up the voltage of the alternating current progressively as the phase of the primary voltage curve advances from maximum toward zero, and vice versa, in such manner as to provide a substantially constant rectified voltage and current; and to provide manually controlled means for adjusting the secondary or rectified voltage.

Illustrative embodiments of this invention are shown in the accompanying drawings, in which—

Figures 1, 2, 3, 4, 19:
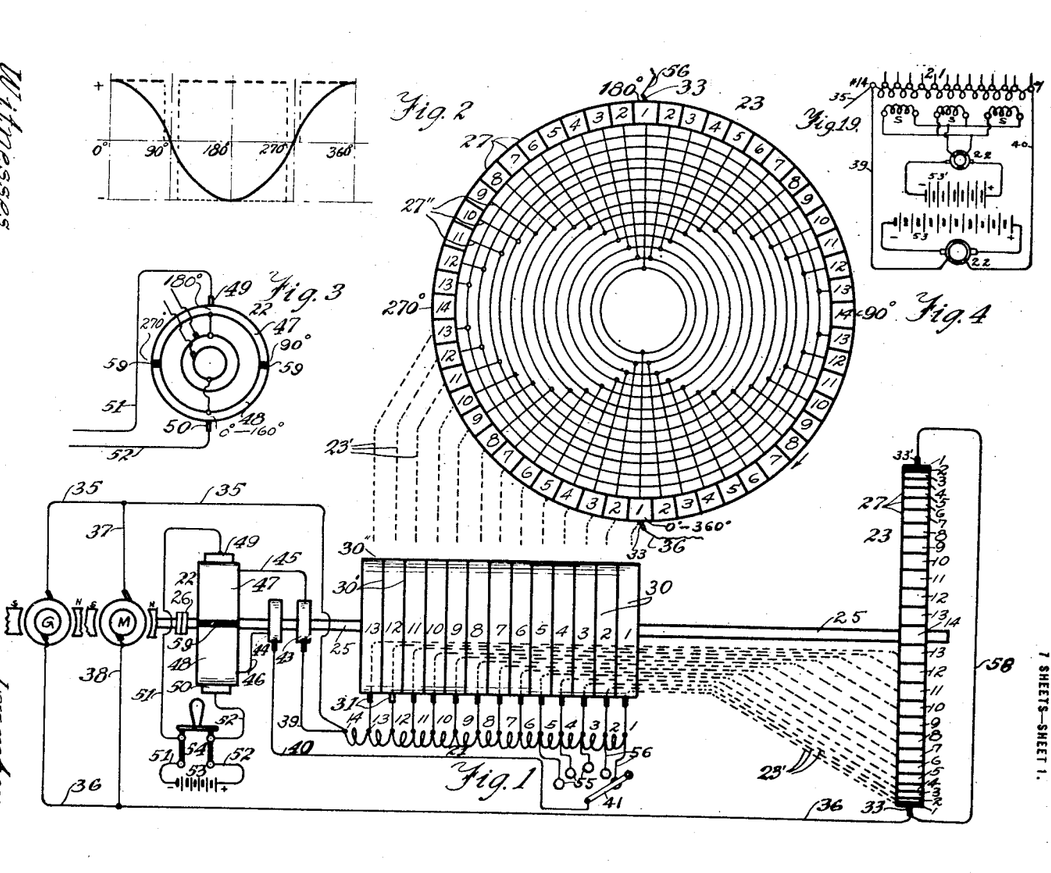
Figure 1 is an elementary diagram for a rectifier equipment including a two-pole synchronous motor and a stationary transformer member.
Fig. 2 is a characteristic curve diagram illustrating both the primary or line voltage and the briefly interrupted secondary or direct voltage resulting from modifying and rectifying the line voltage.
Fig. 3 is a fragmentary diagram showing an end view of the rectifying commutator of Fig. 1.
Fig. 4 is a connection diagram of the rotary switch or controller, shown in Fig. 1, for the transformer member.

In the embodiment shown in Figs. 1, 3 and 4, the rectifier equipment as a whole comprises a transformer member 21, a rectifying commutator 22, a segmental rotary controller or contact changer 23 for periodically adjusting the connection of said transformer member, and a synchronous motor M direct connected to said commutator and controller. Although in practice it is preferable to use a four-pole or moderate speed motor, still where a sixty cycle alternating source is employed, it is practical to use a two-pole high speed motor, and for simplicity of illustration, such a motor is illustrated in Fig. 1. The rotary members are all mounted on a common shaft 25 preferably having a flexible connection 26 to the shaft of the motor. The commutator 22 is accordingly made with two equal segments. The member 21 is preferably, though not necessarily, made in the form of an "auto-transformer," and is hereinafter designated broadly as a "transformer," which in effect it is.

The rotary switch or controller 23 for the transformer comprises a sectional ring, the contact parts or segments 27 being insulated, and certain segments being connected together and to certain contact points of the transformer 21 respectively, in such manner that the transformer is gradually thrown into and out of action progressively as the primary voltage diminishes and increases respectively, said switch being rotated in synchronism with the electric power.

The means for connecting the rotary switch or controller 23 to the stationary transformer 21 comprises a plurality of contact rings 30 in co-rotary relation to said controller and connected in definite order, as by leads 23', to certain successive segments of the latter, stationary brushes 31 for said rings respectively being connected to corresponding contact terminals or taps on the transformer 21. The relation of these connections and various parts of the device is indicated on the drawings by ordinals 1 to 13, as will be understood. The said taps or connections on the transformer 21 may of course be predetermined once for all by distributing a single set of taps or termianls along the length of the transformer in accordance with the successive ratios desired, but as will be apparent, extra taps may be provided whereby the successive ratios may be readjusted as understood in transformer practice. The rings 30 are assembled in a unitary manner with insulation 30' between them and constitute a cylinder 30''.

Figures 5, 15:
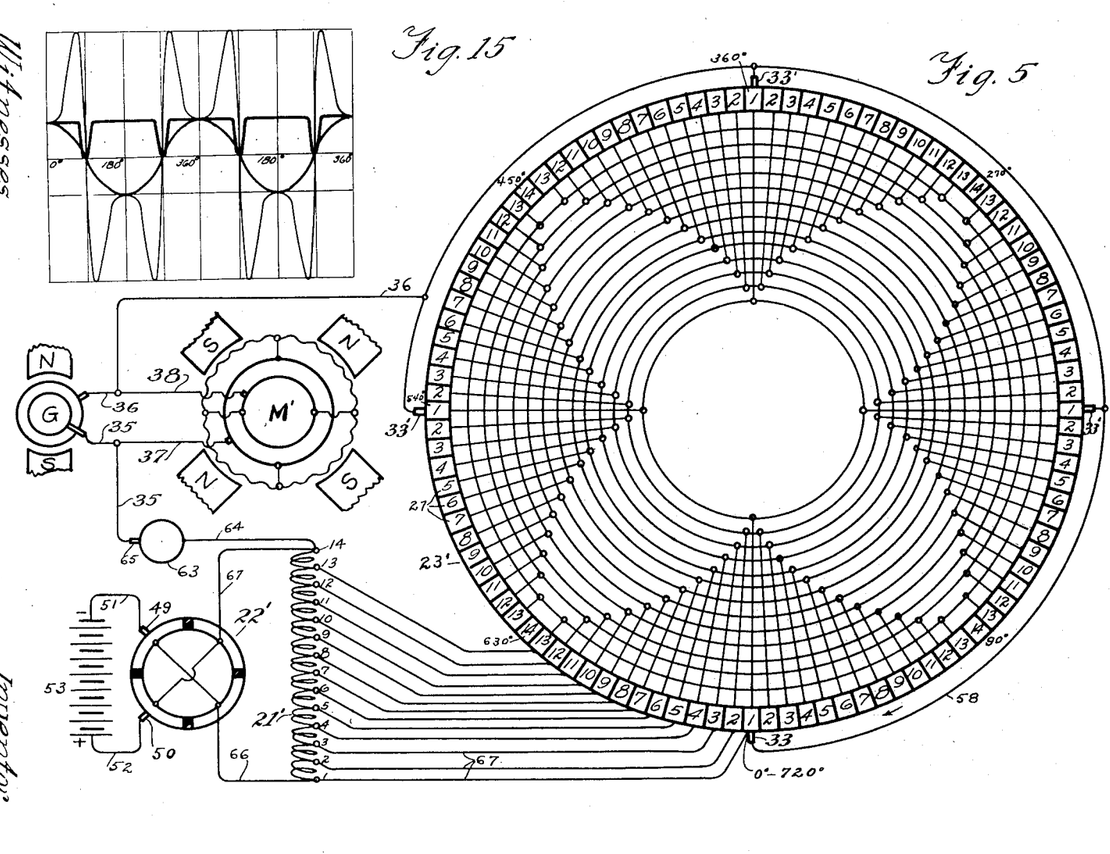
Fig. 5 is a diagram for a rectifier comprising a four-pole motor, and having a transformer member mounted rotatably instead of stationarily.
Fig. 15 is a primary current curve diagram for a single phase converter. (On second sheet of drawings.)

The several figures 1, 3 and 5 all correspond in cyclic phase with zero degrees on the curve diagram of Fig. 2, where 0° represents the maximum primary voltage in one direction, designated plus, 90° represents a minimum or zero volts, and 180° represents the maximum in the opposite direction, designated minus. As the motor M has only two poles and is synchronous with the primary current, it follows that the mechanical or rotary phase period of the rectifier is identical with the phase period of the incoming current.

Referring to the ordinals 1 to 13, it will be seen that rotation of the rectifier causes the brush 33 to bear successively on segments numbered 1 to 13 which are connected to successive corresponding rings 30, and thence through brushes 31 to contacts 1 to 13 on the transformer, whereby the primary turns are gradually diminished, and the transformer ratio expressed as a fraction is changed step-by-step from unity to a minimum, where the variable number of primary turns represents the numerator and the constant number of secondary turns the denominator, as will be understood by reference to Fig. 1.

The circuit connections in detail are as follows: The primary current from the generator G is carried by a pair of line conductors 35 and 36. The motor M is bridged across the line by leads 37 and 38. One lead 35 is connected to terminal 14 at that end of the transformer which is continuously active in a primary sense. The other lead 36 is connected in series through the brush 33, controller 23, cylinder 30'' and one of the brushes 31, to the transformer 21 at any one of its contacts 1 to 13. A pair of leads 39 and 40 for the secondary current extend from the transformer terminal 14 and switch 41 respectively to a pair of collector rings 43 and 44, which in turn are connected by conductors 45 and 46 to the segments 47 and 48 respectively of the rectifier 22, the latter being provided with a pair of brushes 49 and 50 disposed 180° apart. Connected to said brushes are the leads 51 and 52 across which the direct current load 53 is connected, as for instance a storage battery, a switch 54 being connected in series with said leads. The switch 41 has a series of contacts 55 connected by leads 56 to successive points 1, 2, 3, etc., on the transformer, whereby the secondary voltage may be adjusted manually from time to time according to the voltage required for proper charging or according to the number of cells in series in the battery.

The transformer controller or synchronous switch 23 in order to accommodate a complete cycle extending from a maximum voltage in one direction to a maximum in the opposite direction and back again, is provided with a sufficient number of segments to correspond with a series of steps running throughout the complete cycle, for which purpose the segments are multipled for each quadrant. Said segments are arranged and numbered as shown in Fig. 4 where the numbering on each side runs from 1 to 14 and back to 1 for each half of the controller, the segments numbered 1 being disposed 180° apart and corresponding with the maximum voltages positive and negative respectively, the medial segments 14 corresponding with zero voltage and being entirely insulated and dead. The rest of the segments of like denominations numerically are connected together respectively, as shown diagrammatically by rings 27' and radial connectors 27", so that as the controller rotates in synchronism with the primary voltage the brush 33 connects the line lead 36 successively to diminishing fractional parts of the transformer, thereby diminishing the effective primary part of the transformer as the voltage approaches zero, and thereby increasing the step up effect, the secondary connections remaining constant at the points 1 and 14, assuming that a full maximum secondary or direct voltage is desired and the switch 41 is set as shown.

The brush contact area on the controller 23 may to advantage be increased by mounting a second brush 33' at a point 180° from the brush 33 so that said brushes will at any instant bear on segments which are connected together electrically, except when on segments 14, said brushes 33 and 33' being connected by a conductor 58.

The precise shape of the rectified current curve depends upon the design of the transformer and its connections. By disposing the transformer taps 2 to 13 at suitable intervals corresponding with the shape of the primary voltage curve and by making the transformer coils of sufficient current capacity especially adjacent to the terminal 14, it is possible to so modify the secondary voltage as to produce a substantially constant secondary voltage and current, subject to the brief interruptions when the primary voltage approaches close to and passes through zero.

In order that the circuit may be open when the primary voltage is near the zero point, insulation blocks 59 of sufficient size are interposed between the segments 47 and 48 of the rectifier 22. This end may likewise be accomplished by making the dead segments 14 on the controller 23 of suitable width. It is also to be noted that with a given disposition of taps 2 to 13 on the transformer the precise form of the secondary voltage curve may be variously predetermined by suitably adjusting the width of the successive segments respectively of the controller 23.

In view of the well known laws governing the transformer (particularly the auto-transformer), and referring to Figs. 1 and 2, it follows that when the rotary device 23 stands momentarily at 0° (or 360°) the transformer member 21 as a whole is merely bridged across the line in parallel with the direct current load 53, the circuit being from generator G through line lead 35, coil 21, lowermost connection 23', brush 33, and line lead 36, back to generator G. For this position of controller 23 the entire winding 21 acts as a "primary" without any "secondary" (or with the secondary open), and moreover the line voltage at this instant, being at its peak or maximum, is about equal to but somewhat greater than the battery voltage. By virtue of the commutator 22 a substantial repetition of this condition occurs also at 180°. Therefore owing to its self-inductance and the brevity of the interval the winding 21 takes no more than normal current and has no abnormal effect. But as rotation of the switch 23 brings segments 2, 3, 4, etc., under the brushes 33 and 33', only that part of the transformer which is disposed between the end 14 and the contacts 2, 3, and 4, etc. are successively connected as a primary winding across the supply line, and the step-up effect successively increases accordingly, so that the secondary voltage across the terminals 1 and 14 is maintained substantially constant, subject to a brief interruption when the circuit is opened for a few degrees adjacent to the primary zero points, namely at 90° and 270°.

It is apparent that with a constant direct current load on the machine the primary current must increase and rapidly approach infinity as the primary voltage approaches zero, as illustrated in Fig. 15. That is to say, in order to maintain the rectified voltage constant as the alternating voltage wave approaches zero, an increasingly heavy magnetizing primary current is necessary. Even if the apparatus and especially the transformer, were so designed as to withstand injury from excessive currents, still it is apparent that practically there must occur an instant when the secondary voltage falls far below normal, and below the battery voltage. When the primary voltage and current pass through the zero point then the secondary voltage and current also must drop to zero. This of course necessitates periodic opening of the circuit momentarily as will be understood.

For the purpose of illustration, it is assumed, in connection with Fig. 1, that the most available source of power is a 120 volt single phase alternating current circuit and that it is desired to charge a 110 volt storage battery having a normal current capacity of 10 amperes, in which case the power rate is 1100 watts. Assuming (with a view to simplicity of illustrative diagrams) that a speed of 3600 R. P. M. is satisfactory, a two-pole synchronous motor may be used for driving the rectifier. In this instance the rectifying commutator will comprise two segments each of nearly semi-circular extent, and the contact changer which controls the transformer will have its segments disposed symmetrically on opposite sides of a diameter passing through two dead segments disposed oppositely 180° apart, the symmetrically corresponding segments respectively in all four quadrants being connected together, and current being fed thereto by a pair of brushes disposed 180° apart and connected in parallel, the connected segments respectively being designated by like members, as in Fig. 1. Assuming that the controller segments are all of like size, and that there are fifty-two in all, it follows that the segments are disposed on centers approximately 7° apart. (See Fig. 9.) Two of the segments being dead, the circuit is open about 4% of the whole time, full load being carried during the remaining 96% of the time. It is well known that when a pulsating or briefly interrupted current is used for charging a battery of given normal current capacity, it is permissible to provide a correspondingly larger current during the effective periods, so that the brief intervals of open circuit may be fully compensated for by an almost negligible increase in the current during the effective periods.

In operation the two dead segments (numbered 14 on Figs. 1 and 4) come under the brushes as the primary voltage passes through zero in reversing. The circuit is open for 3½° on each side of the zero points corresponding to 90° and 270° respectively. (See Fig. 4.)

Assuming that the primary or alternating voltage is represented by a true sine curve it follows that the minimum effective voltage on the primary is equal to the sine of 3½° (about .06) times the maximum voltage or .06 times 120 which is 7.2 volts. In designing the transformer, the successive steps must have increasing current capacity ranging from the normal charging rate to a maximum primary current of 1100 divided by 7.2 or about 150 amperes. (See Fig. 15.)

In the embodiment shown in Fig. 5, the rectifier is adapted for relatively slow speed, for use when a four-pole motor M' is used instead of a two-pole machine. Corresponding parts are designated by the same numerals as in Fig. 1 except as otherwise shown. In this instance the number of segments on the rectifier proper or comutator 22' is doubled, and the number of switch contacts on the transformer controller 23' is also substantially doubled, so that two complete primary cycles or 720° may be accommodated by one revolution of the rectifier mechanism as a whole.

Figure 6:
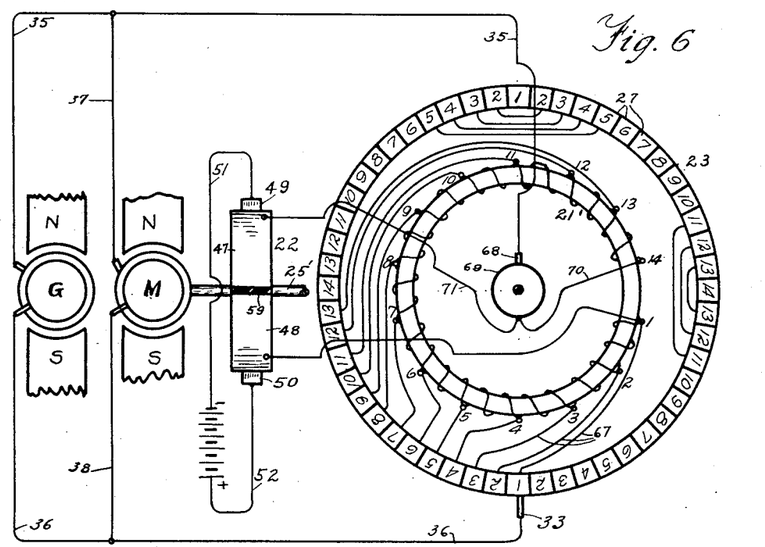
Fig. 6 is a diagram for a rectifier comprising a two-pole motor and a rotatably mounted transformer member.

The transformer 21' here shown is of annular form and mounted to rotate with the controller 23', although a stationary transformer such as shown in Fig. 1 might be used, as will be understood. In this instance eight sets of segments 27, each set representing 90° measured electrically, are connected in multiple, the connectors preferably being arranged uniformly and symmetrically so that the controller will be substantially balanced about the axis of rotation. Although but one brush 33 is necessary for this controller, it is preferable to add three more brushes 33', said brushes 33 and 33' being disposed symmetrically 90° apart mechanically (or 180 electrical degrees), so as to bear always on segments of like denomination. The transformer 21' is preferably made substantially as indicated by the diagram of Fig. 6. In this instance the transformer terminals 1 to 13 are connected directly to the corresponding segments 1 to 13 of the controller, it being understood that said controller and transformer are mounted co-turnably on the same shaft. A collector ring 63 is provided to which the transformer terminal 14 is connected by conductor 64, said ring 63 having a brush 65 to which the primary lead 35 is connected.

Alternate segments of the four-part commutator 22' are connected together and by lead 66 to terminal 1 of the transformer, and the other two segments are connected together and by lead 67 to terminal 14 of the transformer. The rectifier brushes 49 and 50 in this instance are disposed 90° apart and are connected to the direct current load substantially as in Fig. 1.

When run on a sixty cycle single phase circuit the speed of this machine will be about 1800 revolutions per minute.

In the embodiment shown in Fig. 6, a rotary transformer member 25' is shown in combination with a two-pole motor M and corresponding controller and commutator members. In this instance the two-part rectifying commutator 22 and the transformer controller 23 are substantially like those shown in Fig. 1, but the transformer instead of being stationary, as there shown, is connected directly by leads 67 to the controller segments 27, and rotates in fixed relation to the driving shaft 25' and parts carried thereby. The line lead 35 runs to a brush 68 on the ring 69, which is connected by leads 70 and 71 to the transformer terminal No. 14 and rectifier segment 47 respectively.

Figures 7, 8:
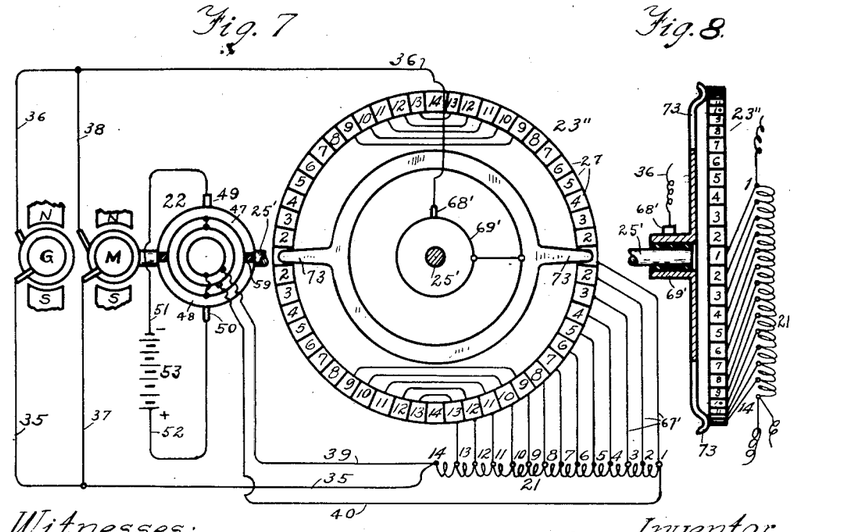
Fig. 7 is a diagram of a rectifier comprising a stationary transformer and annular contact changer or regulator therefor, and a rotary brush member for coaction with said regulator.
Fig. 8 is a side elevation of the direct connected motor driven mechanism represented diagrammatically in Fig. 7.

In the embodiment shown in Figs. 7 and 8 the equipment is similar to that shown in Fig. 1, except that the transformer controller 23'' is stationary instead of rotary and the contact members or brushes 73 therefor are mounted co-rotatably with the motor instead of being stationary, the connections for the transformer and controller being modified accordingly, the collector rings 1 to 13 and the brushes 31 of Fig. 1 being eliminated and the transformer contacts 1 to 13 being connected directly to the controller segments 1 to 13 respectively by leads 67', as will be understood. The line lead 36 is connected to a brush 68' on the ring 69' which is connected electrically to the brushes 73. It will be noted that when a rotatably mounted Gramme ring transformer is used, as illustrated in Figs. 6 and 8, the number of moving contacts is reduced to a minimum. Although the weight and moment of inertia of the rotary part is greater than when the transformer is stationary, the size of motor necessary to drive the rectifier is substantially the same for both forms, as the increased journal friction and wind resistance of the rotary transformer embodiment is about equally offset by the elimination of brush friction encountered in the stationary transformer embodiment of Fig. 1.

Figures 9, 18:
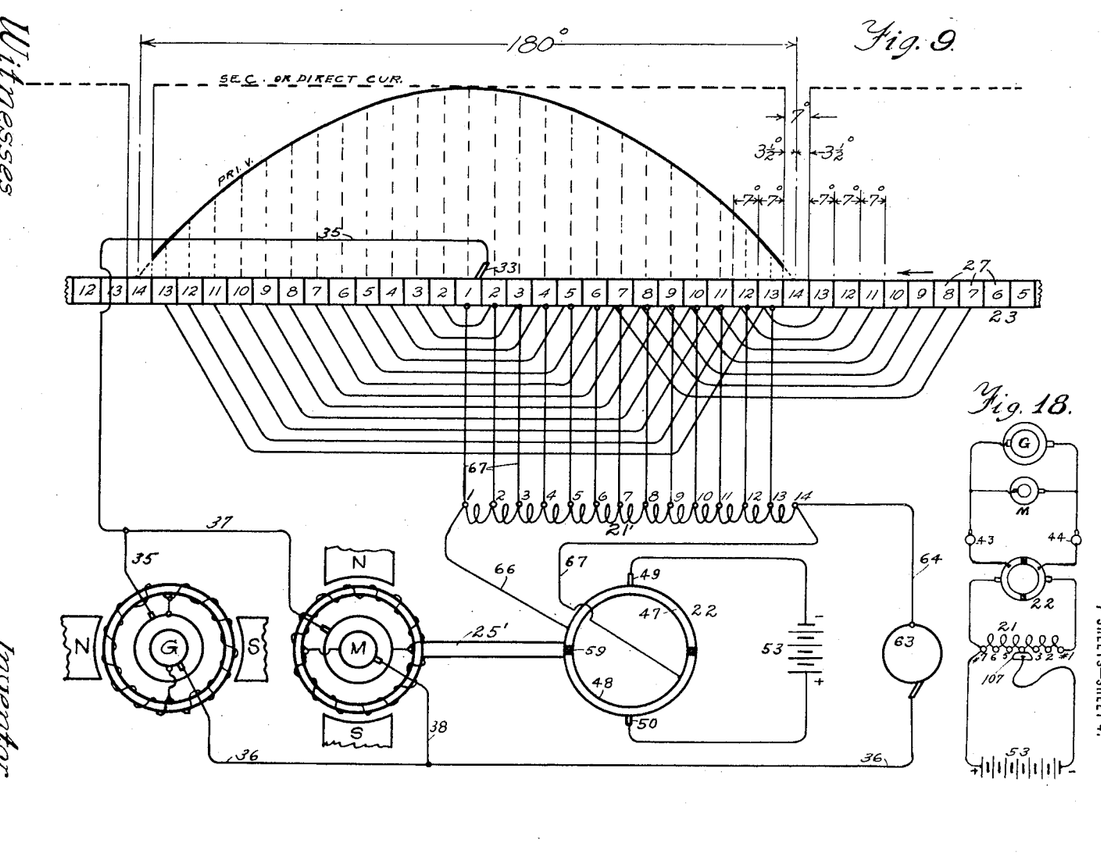
Fig. 9 is a diagram for a rectifier comprising a rotary transformer member and a segmental switch or contact changer therefor, the latter being projected in a plane with the primary and rectified voltage curves developed accordingly along the length thereof.
Fig. 18 is a diagram of an embodiment in which the primary current is first rectified and then introduced to the transformer and evening means.

In the embodiment shown in Fig. 9, the parts are substantially like those shown in Fig. 1, except that a rotating transformer 21' is used and the diagrammatic arrangement is modified in order to more clearly visualize the phase relation of the primary voltage and the corresponding angular position of the rotary parts of the rectifier. For this purpose the controller 23 is represented fragmentarily as projected in a plane with characteristic curves and electrical degrees indicated along its length.

Referring to the generators G and motor M of Fig. 9, it will be seen that the angular position of the armatures with respect to the field poles represent the instant of maximum primary voltage. It will be noted furthermore that the controller brush 33 connected to one side of the primary source at this instant rests upon one of the controller segments numbered 1, which is connected to the transformer terminal No. 1. The other side of the primary circuit is connected through the collector ring 63 to the opposite terminal 14 of the transformer. The battery 53 is also connected across the terminals Nos. 1 and 14 of the transformer. Hence, at the instant represented the transformer has no effect, and the maximum primary line voltage is impressed directly on the battery. As the rotary member turns in the direction indicated by the arrow the brush 33 passes over successive controller segments 2, 3, 4, etc., corresponding with the transformer terminals Nos. 2, 3, 4, etc., respectively, whereby the effective primary turns of the transformer is gradually diminished, the secondary turns remaining constant thus gradually increasing the step-up effect of the transformer until brush 33 rests on segment 13. As the brush passes from segment 13 onto the dead segment 14 the primary circuit is opened, this occurring at the instant the primary voltage changes from one polarity to the other, or passes through zero. As soon as the brush 33 passes onto segment 13, the circuit is again closed and the primary turns of the transformer are gradually increased as the brush moves forward over intermediate segments to the next segment No. 1. The primary voltage is represented by the heavy line, and the briefly interrupted constant potential secondary current is represented by the dotted line. The primary and secondary voltage lines correspond with the similar lines of Fig. 2.

Figures 10, 11, 16:
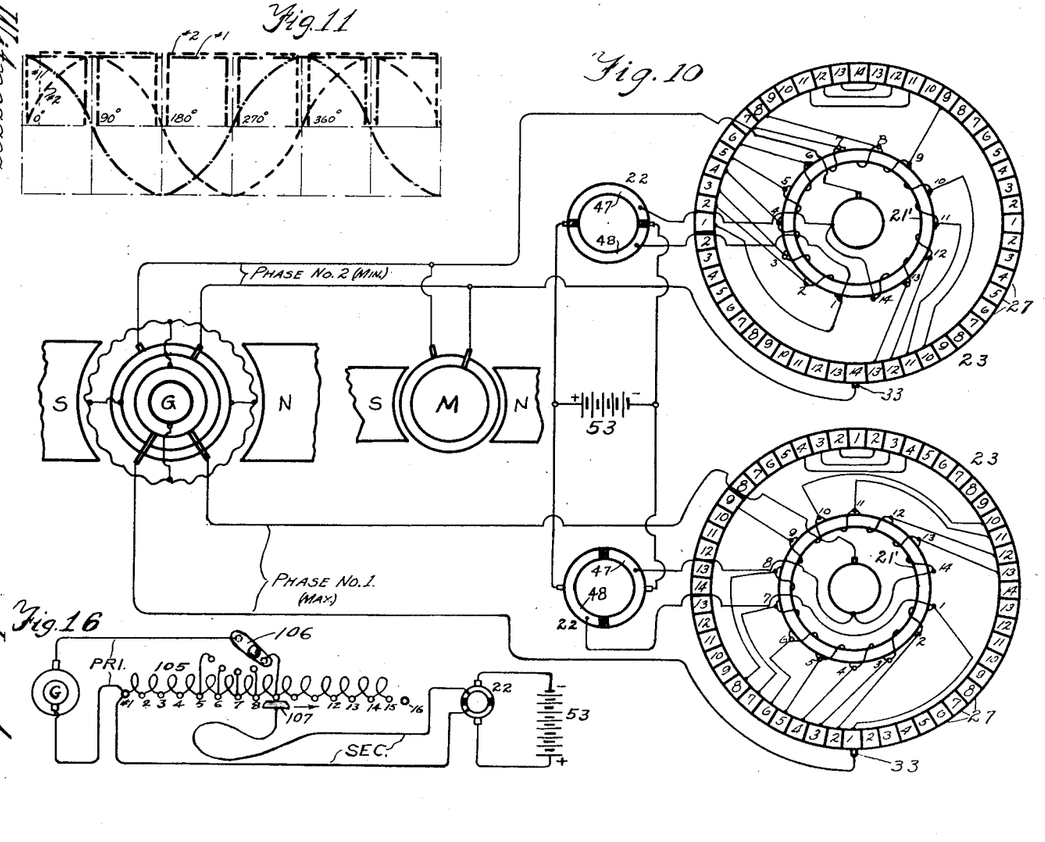
Fig. 10 is a diagram of a two-phase rectifier equipment.
Fig. 11 is a curve diagram for the two-phase rectifier of Fig. 10.
Fig. 16 is a diagram of a rectifier in which the automatic controller changes the connection of the secondary circuit instead of the primary in synchronism with the current source, the primary circuit being connected either permanently or in accordance with the position of an adjustable regulator.

In the embodiment shown in Fig. 10, the rectifier is adapted for operation on a two phase circuit in which case the circuit for the rectified currents of both phases are connected together in parallel for charging the battery. It will be noted that owing to the angular difference in the phase of the two branches of the circuit shown, the instant of open circuit on o branch occurs when the other circuit is closed and vice versa, so that the full normal voltage is maintained on the direct current or battery leads continuously. For the purpose of illustration, two similar transformers 21' of the rotating type, each provided with a controller 23 and a rectifying commutator 22 substantially similar in all respects to the device shown in Fig. 6, are provided one for each of the two phases Nos. 1 and 2. The rectifying apparatus connected to phase No. 2 is shown disposed at an angle or phase relation of 90° with respect to that shown in connection with phase No. 1. It will be noted that phase No. 1 represents the instant of maximum voltage, while phase No. 2 represents the instant of minimum or zero voltage.

Referring to Fig. 11, corresponding with Fig. 10, the primary voltage curves are numbered 1 and 2. The rectified secondary currents are correspondingly represented by numerals 1 and 2. In order to distinguish the secondary currents Nos. 1 and 2 from each other, the line representing phase No. 2 is raised somewhat above that of phase No. 1. The overlapping of one secondary current line over the openings in the other is clearly apparent from this figure.

Figures 12, 13, 17:
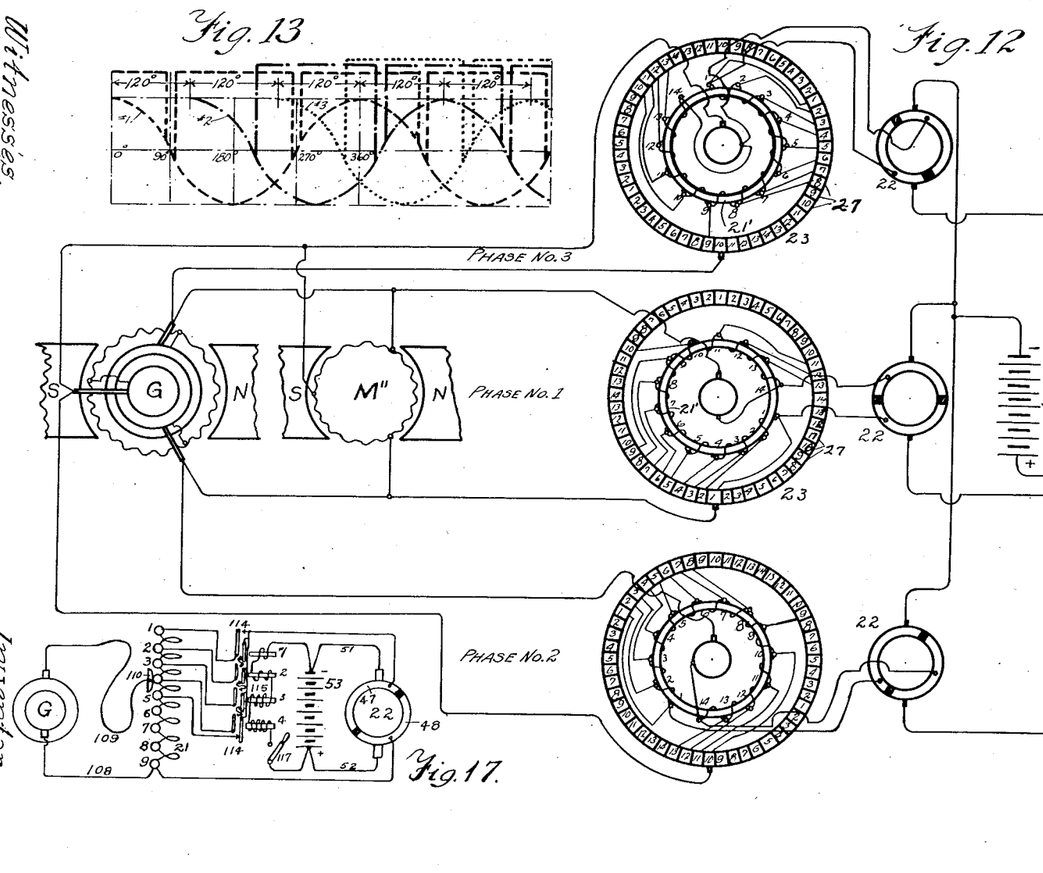
Fig. 12 is a diagram of the three-phase rectifier.
Fig. 13 is a curve diagram for the three-phase rectifier of Fig. 12.
Fig. 17 is a diagram of a battery charging rectifier device including an automatic transformer switch controlled by the voltage of the battery.

In the embodiment shown in Fig. 12, a rectifier equipment is shown adapted for use on a three phase circuit. Each of the three phases Nos. 1, 2, and 3 is provided with a transformer 21', a controller 23 therefor, and a rectifying commutator 22, the form illustrated in Fig. 6 being shown for convenience of representation diagrammatically. All of the rotary parts, it will be understood, are connected on a common shaft, suitably connected to the three phase motor M''. The rotary equipments for each of the three phases are disposed at an angle of 120° from one another as shown in Fig. 12. It will be understood that any synchronous motor may be used, and that a single phase motor could be run on one of the primary phases, in place of a three phase motor.

Characteristic curves for the three phase rectifier are shown in Fig. 13, where the primary voltage pressures and rectified secondary currents are respectively represented by lines of like character. It will be noted that the openings in each of the lines representing rectified currents are overlapped by the lines representing currents of the other two phases, so that the secondary voltage and current are maintained substantially uniform and constant.

Figure 14:
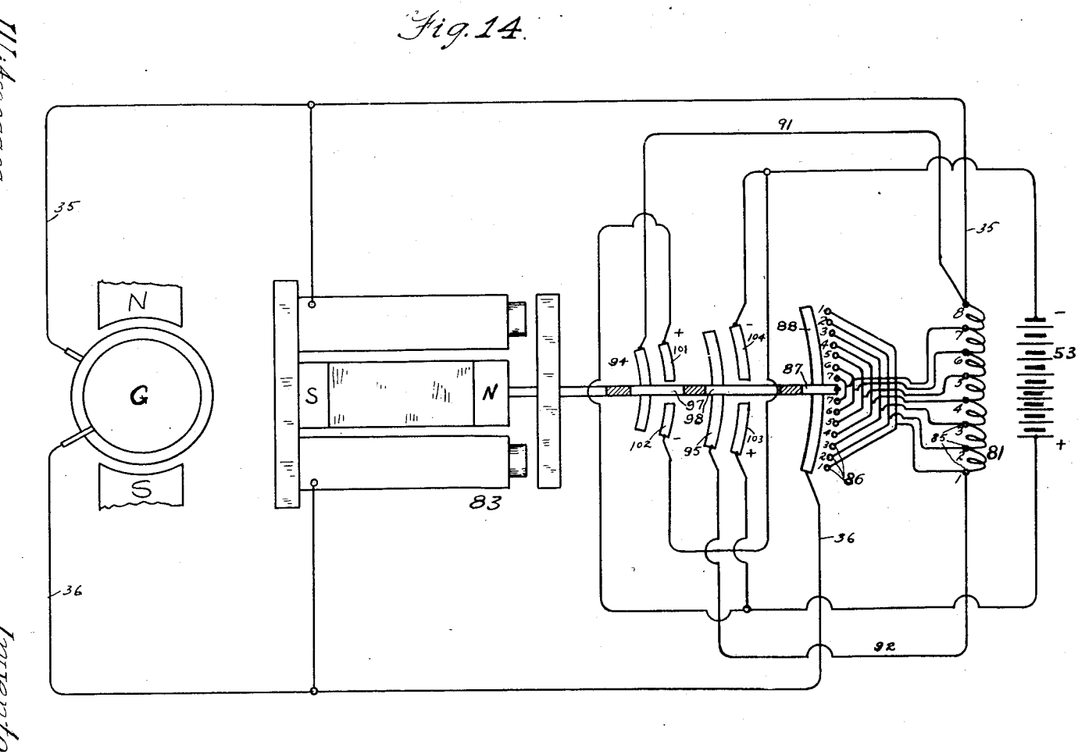
Fig. 14 is a diagram of a rectifier comprising a stationary transformer and a vibrating controller and commutator.

In the embodiment shown in Fig 14, the rectifier equipment comprises a stationary transformer 81 in combination with a vibrating controller therefor and a commutating member, both actuated by a vibrator 83 connected to the source of current G, said vibrator being of polarized character as will be understood and adapted to operate uniformly in synchronism with the primary power.

The transformer 81 has a series of taps 85 leading to controller contacts 86 arranged for successive engagement by the vibratory switch member 87, said contacts being arranged in duplicate in a continuous series, one series being connected to the other respectively. Said member 87 slides on a plate 88 connected to one side 36 of the primary circuit. The outermost contacts (each designated No. 1) are connected to the No. 1 terminal of the transformer, the middle contact being entirely insulated or dead, so that the circuit is opened momentarily as the primary voltage passes through zero. Secondary leads 91 and 92 extend from the terminals of the transformer to a pair of contact strips 94 and 95 respectively, disposed in the path of a pair of contacts 97 and 98 on the vibrator. Furthermore, a pair of fixed contacts 101 and 102 are disposed opposite said contact member 94, said fixed contacts being connected to the battery. Similar contacts 103 and 104 are fixed opposite contact 95 and are also connected to the battery. Contacts 101 and 103 are of positive polarity and are on opposite sides of the vibrator switch. Contacts 102 and 104 are disposed in similar manner, but are both negative. The vibration of the arm carrying said contacts 87, 97 and 98 causes the latter contacts or switching connectors to connect the corresponding contacts 94 and 95 with the adjacent contacts 101, 102, 103 and 104. This embodiment, though of limited capacity, is intended for installations where only a small current is required.

In the embodiment illustrated by Fig. 16 the alternating current primary circuit extending from generator G is connected on one side to a terminal No. 1 of the transformer member 105, and on the other side to a switch 106 adapted for raising or lowering the secondary voltage as desired, said switch having contacts connected with a series of points disposed along the length of the transformer member, as will be understood. The secondary circuit is connected on one side to the said terminal No. 1, and on the other side is arranged and connected so as to vary the number of effective secondary turns according to a simple harmonic motion operating in synchronism with the primary current, a sliding contact or brush 107 being shown for convenience of illustration, it being understood that any of the synchronous switching or control means above described may be adapted and applied to effect the same purpose, and furthermore that said brush might be caused to move in the manner required by a synchronously operated crank and crank rod or the like, as well understood in various mechanical arts, though in said Fig. 16 no specific means are shown for moving said brush 107. Except as otherwise described the secondary circuit is connected to the battery 53 through the rectifying commutator 22, as in Fig. 9.

In the embodiment shown in Fig. 17 the primary current from the generator G is fed to the transformer member 21 by a pair of leads, one of which, 108, is connected to the transformer terminal number 9 and the other lead 109 is connected through any suitable synchronously operated means, as for instance the brush 110, which slides back and forth over the transformer, contacts numbers 1 to 8 inclusive.

The secondary circuit extends from the transformer member to the battery 53, through the rectifying commutator 22, which is provided with a pair of brushes with leads 51 and 52 extending to the terminals of the battery. That part of the circuit which extends from one segment 47 of the commutator to the transformer terminal 1 and the taps adjacent thereto, includes a plurality of switch members 114 connected in multiple and controlled by a corresponding set of electro-magnets or relays 115 respectively, which are connected in series with each other across the terminals of the battery, a manual switch 117 being included in the relay circuit. In order that the relays may operate successively in accordance with the voltage of the battery, the number of turns on the windings are proportional to the voltage at which it is desired that the relays should operate respectively, relay number 1 being here shown with a single turn, relay number 2 with two turns, relay number 3 with three turns, and relay number four with four turns, so that as the voltage increases the relays will operate in reverse order to that above enumerated. Each relay is provided with an armature having a pair of switch members or springs constituting the "switch" 114, one of which springs is normally open and the other normally closed. The connections are so arranged that when relay number 4 operates, that part of the transformer winding between the taps 4 and 5 will be added to the effective turns of the transformer. In like manner the successive operation of the other relays will add the corresponding additional sections of the transformer winding. When relay number 1 is operated the secondary circuit is connected across the full length of the transformer winding, whereby the maximum voltage is produced.

In the embodiment shown in Fig. 18 the current from the source G is first passed through the rings 43 and 44 and rectified at 22, and the pulsating current is applied to the transformer member 21 at the end contacts Nos. 1 and 7. The battery 53 is connected on one side to the terminal No. 7 and on the other side through the sliding contact or shoe 107 to the contacts Nos. 1 to 6 successively and inversely, said shoe or its equivalent being operated by the synchronous motor M, as will be understood, to increase the step-up effect of the member 21 as the primary voltage approaches zero.

When a polyphase rectifier is used, and the secondaries are connected in parallel, as above described, the primary currents are equalized so as to eliminate or greatly reduce the sharp narrow peaks, such as appear in the primary current curve shown by Fig. 15. When a three phase circuit is used the primary current curve for each phase more closely resembles the corresponding secondary current curve, being nearly uniform except for the momentary interruptions when the primary voltage drops to zero.

Although certain specific embodiments of this invention are herein shown, it is to be understood that no attempt has been made to show specifically all useful embodiments, and that numerous details of the constructions shown may be altered or omitted without departing from the spirit of this invention as defined by the following claims.

I claim:

1. A source of alternating current, rotary rectifying means therefor, a motor adapted for driving said rectifying means in synchronism with the alternating current, and means for boosting the voltage on each side of the peak of the alternating current voltage curve, so as to produce a substantially uniform current during nearly a complete half cycle.

2. A source of alternating current, a synchronous motor connected thereto, a rectifier operated by said motor, a transformer and a controller therefor connected in series with the primary circuit, said controller being operated by said synchronous motor and being adapted to cut parts of the transformer in and out successively step by step in a definite cycle as said motor rotates.

3. A rotary rectifier including a transformer and a controller therefor, one of said members being adapted to be rotated with respect to the other, said controller comprising a brush connected to the current source and an annular series of contact members or segments connected in an even number of symmetrically disposed groups with corresponding segments respectively in multiple, the segments of each group being connected to a corresponding series of terminals or taps on the transformer, and said groups of segments being arranged in order successively for contacting with said brush for varying, in a manner which may be predetermined by adjustment of connections, the number of effective turns on the transformer as the rotary member moves in synchronism with the primary power circuit.

4. An auto-transformer having a pair of terminals for the secondary circuit and a series of taps along the length thereof for connection of the primary circuit, in combination with a controller for automatically changing the primary connections to alternately diminish and increase the effective primary turns step by step in synchronism with the primary power, said controller comprising an annular series of segments and a brush for supplying current thereto, said controller and brush having relative movement in synchronism with the primary power, said auto-transformer having one end connected to one side of the line, and said segments being grouped symmetrically in multiple to correspond with a complete cycle of the primary voltage.

5. A three-phase rectifier, comprising a synchronous motor adapted to run on one or more phases of the primary circuit, a shaft connected coturnably to said motor, rectifying and evening means for each phase rigidly mounted on said shaft at an angle of 120 degrees from one another, and each adapted to change the current of the corresponding phase from alternating to a constant potential direct current having only brief interruptions, the rectified current circuits for each phase being connected in multiple whereby the interruptions in the direct current of each circuit are overlapped by the currents in the other two circuits.

6. In combination, a source of alternating current, rotary rectifying means and a synchronous motor therefor, and inductive means operated by said motor for equalizing the direct voltage so as to produce a current closely resembling an ordinary direct current.

7. In combination, a source of alternating current, an auto-transformer connected thereto, means for changing the connection of said auto-transformer for varying its influence on the secondary current, a rectifying commutator connected in the secondary circuit of said auto-transformer, and means for operating said commutator and the connection changer synchronously with the alternating current.

8. A source of alternating current, a synchronous motor connected thereto, an auto-transformer and a controller therefor connected in series with the primary circuit, said controller being operated by said motor and being adapted to cut parts of the auto-transformer in and out successively step by step in a definite cycle as said motor rotates, and a rectifying commutator connected in the secondary circuit and operated by said motor.

9. An auto-transformer, primary and secondary circuits connected thereto, a series of taps along the length of said auto-transformer for variable connection of the primary circuit, in combination with a controller adapted for automatically changing the primary connections to alternately diminish and increase the effective primary turns step by step in synchronism with the primary current, and means for manually adjusting the secondary connections to include more or less turns according to the secondary voltage desired.

10. A polyphase rectifier having means connected in multiple for rectifying and evening the current of each phase, said means for each phase including a rectifying commutator and an auto-transformer provided with a synchronously operating switch and means for adjusting the secondary or derived voltage of each phase, which latter means includes a manual control switch adapted to change transformer connections to vary the ratio of primary and secondary voltages.

11. Means for changing a polyphase alternating current into a direct current, comprising a synchronous motor, a rectifying commutator for each phase, a transformer member for each phase and means for automatically varying the ratio of the primary and secondary of each transformer in accordance with the phase of the primary circuit to produce a secondary current of substantially uniform potential for each phase, the secondaries of said transformers being connected in multiple, and coacting manual means adapted for controlling the secondary voltage of the transformer member.

12. A mechanical rectifier, an inductive evening device or equalizer having positively variable primary and secondary circuits connected thereto adapted for straightening one or more of the characteristic curves or parts thereof, and a source of alternating current connected to one of the two first mentioned parts.

13. In a device of the class described rectifying means including a synchronous motor having a commutator coturnably connected thereto, in combination with or connected to positively operated transformer evening means, and a pair of circuits, secondary and primary, one of which is connected to the rectifying means and the other to the evening means, said evening means being adapted and arranged to vary the transformer ratio in accordance with the phase angle.

14. A polyphase rotary rectifier, comprising rectifying and evening members for each phase, said members being connected in multiple to produce a uniform direct current, said evening members being adjustable to produce any desired voltage or change of voltage.

Signed at Chicago this 28th day of July, 1916.

WILLIAM B. LUCAS.